United States Patent
Redmann, Jr. et al.

(10) Patent No.: US 7,890,228 B2
(45) Date of Patent: Feb. 15, 2011

(54) POWER SOURCE MONITORING SYSTEM FOR AGVS AND METHOD

(75) Inventors: Jerry L. Redmann, Jr., Sparta, MI (US); Matthew L. Werner, Ada, MI (US); Garry A. Koff, Grand Rapids, MI (US)

(73) Assignee: Savant Automation, Inc., Walker, MI (US)

( * ) Notice: Subject to any disclaimer, the term of this patent is extended or adjusted under 35 U.S.C. 154(b) by 0 days.

(21) Appl. No.: 12/325,843

(22) Filed: Dec. 1, 2008

(65) Prior Publication Data

US 2010/0138095 A1 Jun. 3, 2010

(51) Int. Cl.
*G06F 7/00* (2006.01)
(52) U.S. Cl. ...................................................... 701/29
(58) Field of Classification Search ............... 701/1, 701/2, 29, 33
See application file for complete search history.

(56) References Cited

U.S. PATENT DOCUMENTS

| | | | |
|---|---|---|---|
| 4,876,513 A | 10/1989 | Brilmyer et al. | |
| 5,545,967 A | 8/1996 | Osborne et al. | |
| 6,127,806 A | 10/2000 | Tango et al. | |
| 6,175,211 B1 | 1/2001 | Brotto et al. | |
| 6,498,454 B1 | 12/2002 | Pinlam et al. | |
| 6,545,449 B2 | 4/2003 | Ueda et al. | |
| 6,611,128 B2 | 8/2003 | Minamiura et al. | |
| 6,661,201 B2 | 12/2003 | Ueda et al. | |
| 7,193,394 B2 | 3/2007 | Ueda et al. | |
| 2006/0052918 A1* | 3/2006 | McLeod et al. | 701/29 |

FOREIGN PATENT DOCUMENTS

| | | |
|---|---|---|
| JP | 11285109 | 10/1999 |
| JP | 200219951 | 7/2002 |
| JP | 2006048210 | 2/2006 |
| JP | 2007134130 | 5/2007 |

* cited by examiner

*Primary Examiner*—Kim T Nguyen
(74) *Attorney, Agent, or Firm*—Price, Heneveld, Cooper, DeWitt & Litton LLP

(57) ABSTRACT

An automatic guided vehicle (AGV) and method has at least one AGV with a drive assembly, a rechargeable power source on-board the AGV configured to supply power to the drive assembly, and a controller on-board the AGV. The controller on-board the AGV is configured to substantially continuously monitor at least two conditions including an operating condition of the AGV, a state of charge of the power source, and an electrical power supplied for recharging the rechargeable power source, wherein the controller determines when the rechargeable power source of the AGV is to be recharged, and controls a recharging process of the power source based upon at least one of the monitored conditions.

21 Claims, 3 Drawing Sheets

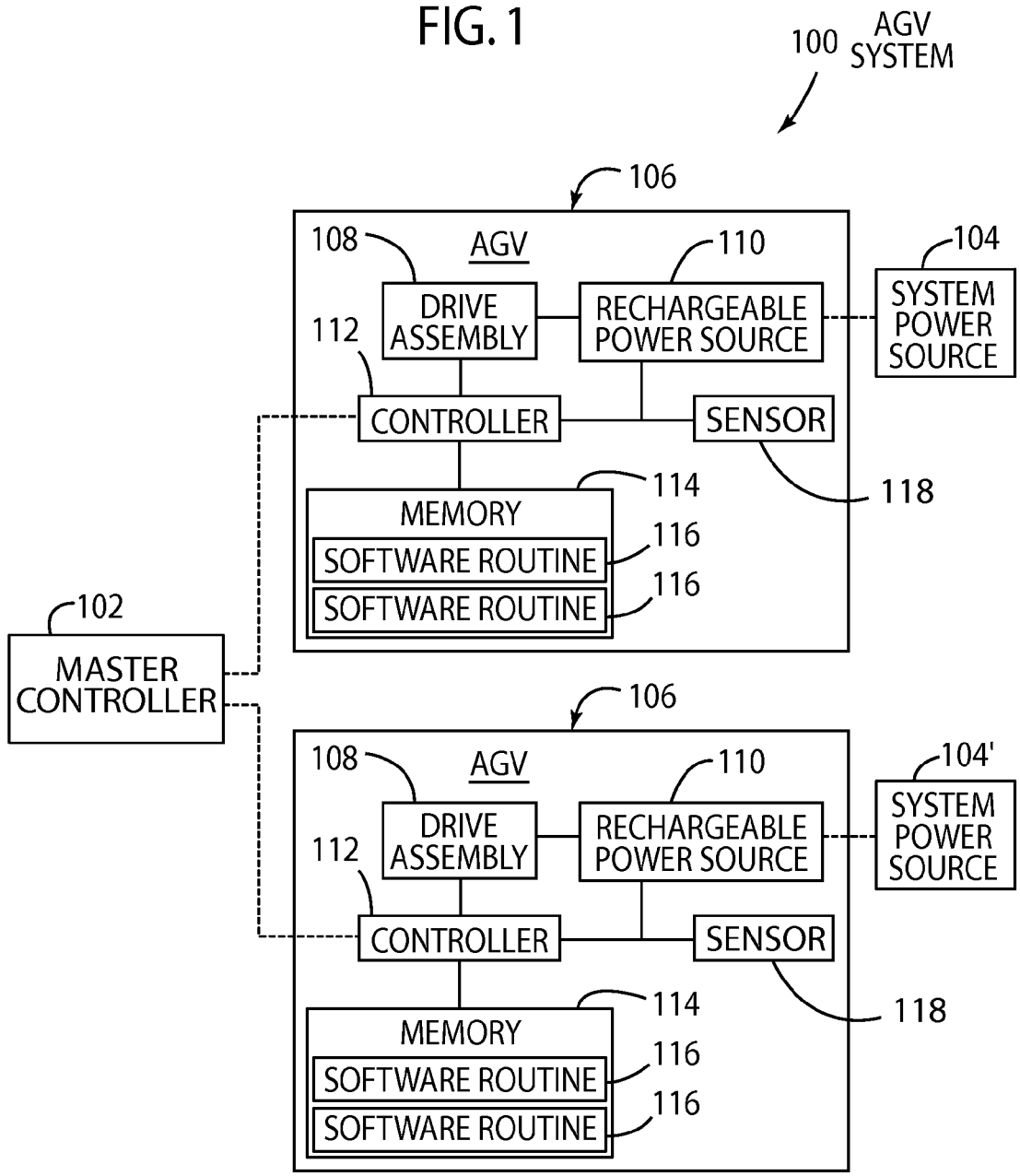

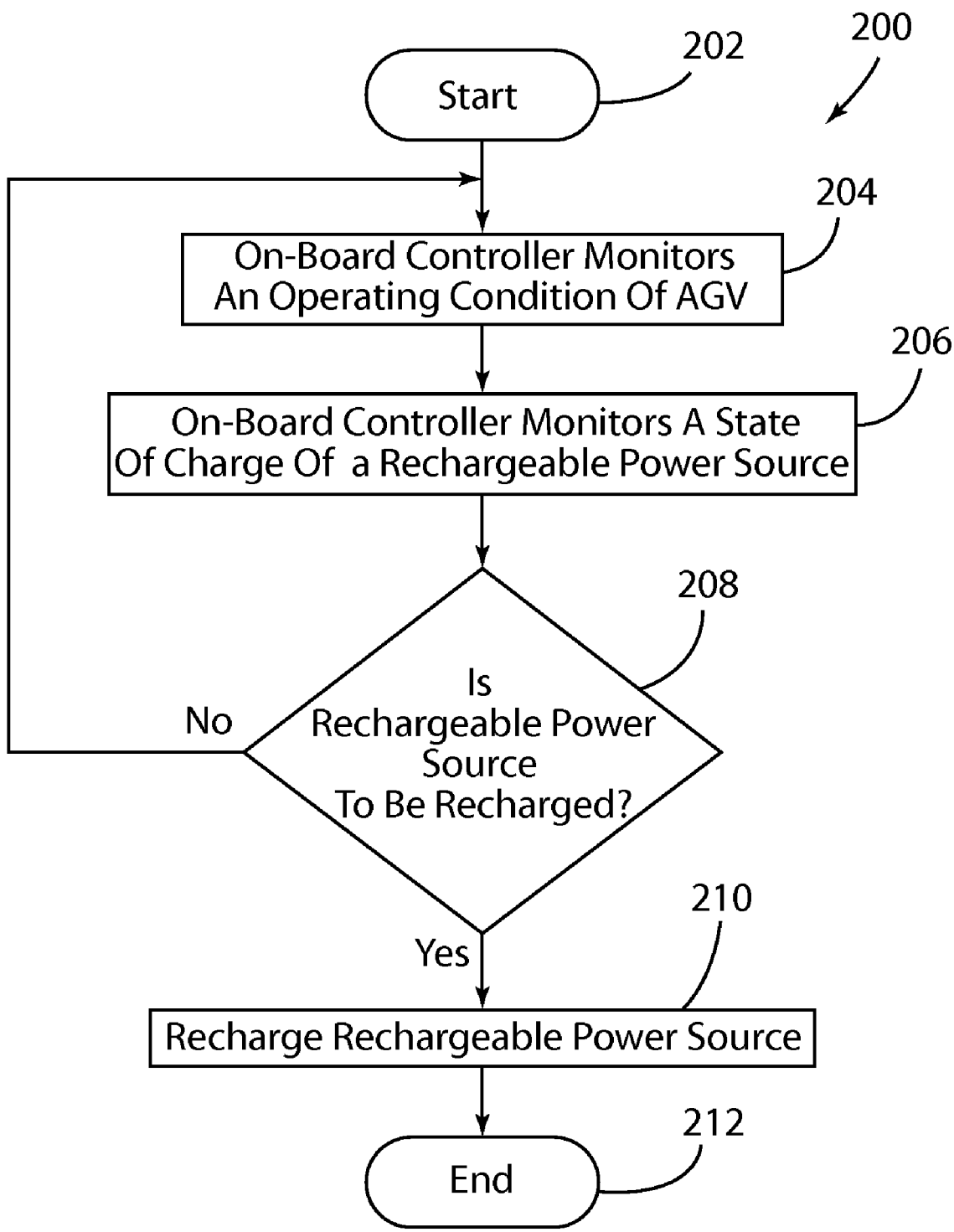

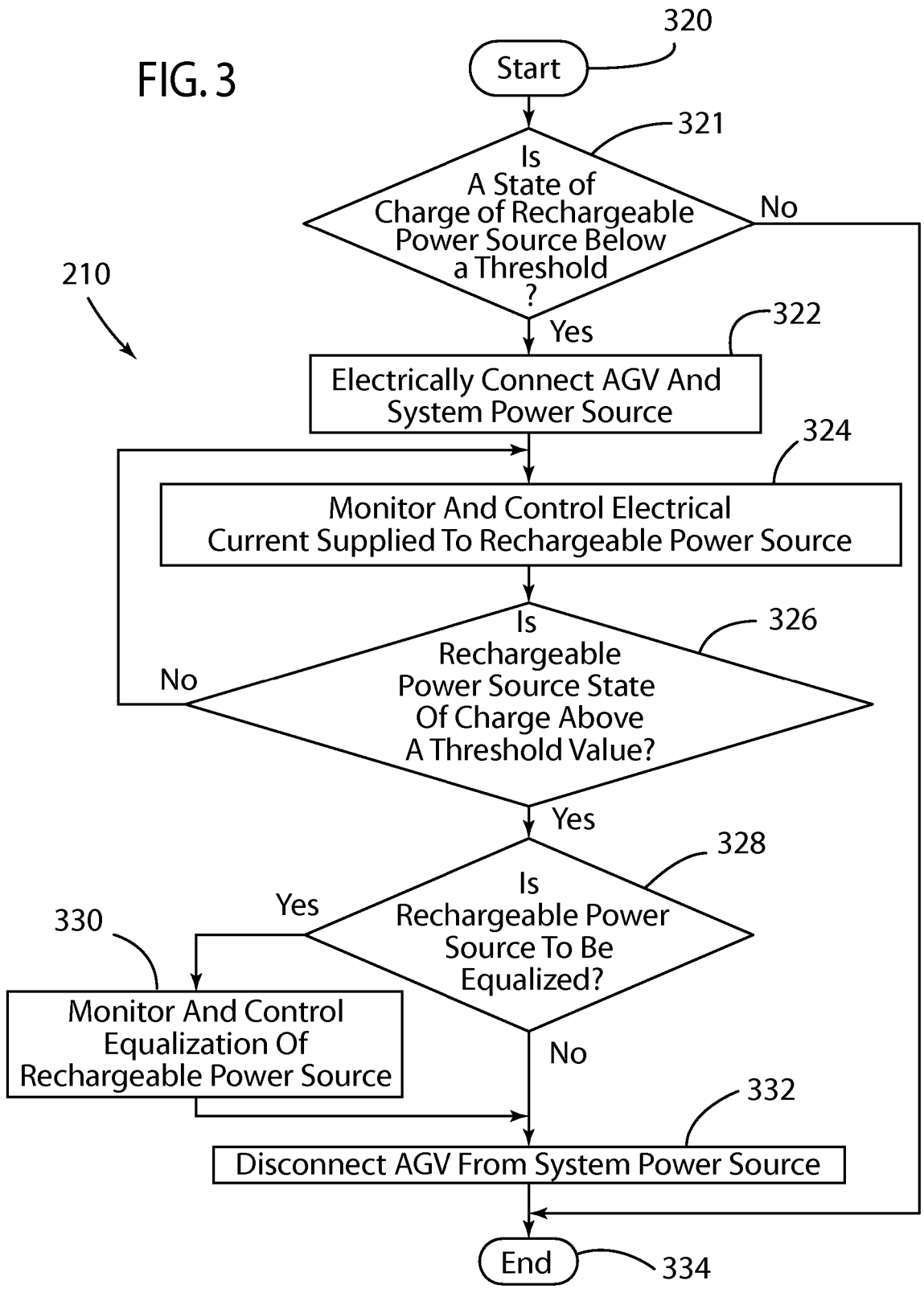

POWER SOURCE MONITORING SYSTEM FOR AGVS AND METHOD

FIELD OF THE INVENTION

The present invention generally relates to automatic guided vehicle (AGV) systems, and more particularly, to an AGV system and related method which employ on-board controllers to monitor the AGVs and control the charging of the on-board rechargeable power sources.

BACKGROUND

Generally, automatically guided vehicles (AGV) are used in large warehouses, factories, and/or shipyards in order to move or transport loads along predetermined paths. Since the AGVs transport loads along a predetermined path, each AGV does not require an operator to control or drive the AGV. Instead, AGVs generally transport the loads along the predetermined paths based upon a series of commands or signals received from a system controller. One exemplary AGV method and apparatus is disclosed in U.S. Pat. No. 6,721,638, entitled "AGV POSITION AND HEADING CONTROLLER," the entire disclosure being hereby incorporated herein by reference. Typically, the AGVs are powered by a battery on-board the AGV to travel along the predetermined paths, and are not electrically connected to a system power source during normal AGV operation.

The batteries generally used on the AGVs are recharged based upon the electrochemical composition of the battery. Thus, if a battery manufacturer instructs or recommends that the battery only be charged to a specific state of charge and to periodically fully charge and equalize the battery, the AGV system must be equipped to recharge the batteries as such. In one exemplary scenario, such as in an opportunity charge system, the AGV will be commanded or programmed to proceed to a charging station if the AGV does not have to perform a command received by a system controller. Typically, the system controller of the AGV system monitors each of the AGVs, such that the system controller wirelessly receives data as to the operating conditions as each AGV to determine when the AGV battery should be recharged. Thus, each AGV typically includes circuitry and a transceiver for communicating the operating conditions of the AGV and other instructions between the system controller and the AGV, so that the system controller can determine when each AGV battery is to be charged based upon data received from other AGVs of the AGV system.

In another exemplary system, such as a battery exchange system, a maintenance schedule can be utilized by an operator of the AGV system as to when the battery of the AGV should be physically removed in order for the battery to undergo a full recharging and/or equalization. Typically, the AGV battery is removed and replaced with another battery, so that the AGV battery can be fully recharged and equalized by another AGV system component. Due to the expense of the AGV battery, in addition to an expense of the labor to remove and replace the battery, it can be important to follow the battery manufactures maintenance schedule to maximize the life of the battery. Thus, in a battery exchange system, and possibly an opportunity charge system, the number of batteries typically needed is two or three times the number of AGVs in the system, such that there is a great expense for the additional batteries and the labor for removing and replacing the batteries.

SUMMARY OF THE PRESENT INVENTION

According to one aspect of the present invention, an automatic guided vehicle (AGV) system for automatically transporting loads along a predetermined path is provided, wherein the improvement includes a stationary master controller, at least one stationary system power source, and a plurality of self-propelled AGVs. At least one of the AGVs includes a drive assembly, a rechargeable power source on-board the AGV, and a controller on-board the AGV. The rechargeable power source of the AGV is configured to supply power to the drive assembly for moving the AGV, along the predetermined path, wherein the rechargeable power source is adapted to be selectively electrically connected to the system power source, which supplies an electrical power to recharge the rechargeable power source. Further, the controller on-board the AGV is configured to substantially continuously monitor at least two conditions including an operating condition of the AGV and a state of charge of the rechargeable power source, whereby when the rechargeable power source is electrically connected to the system power source, the controller determines when the rechargeable power source of the AGV is to be recharged, controls a recharging process of rechargeable power source, and communicates at least one of the monitored conditions to the master controller.

According to another aspect of the present invention, an AGV including a drive assembly, a rechargeable power source on-board the AGV configured to supply power to the drive assembly, and a controller on-board the AGV. The controller on-board the AGV is configured to substantially continuously monitor at least two conditions including an operating condition of the AGV, a state of charge of the power source, and an electrical power supplied for recharging the rechargeable power source, wherein the controller determines when the rechargeable power source of the AGV is to be recharged, and controls a recharging process of the power source based upon at least one of the monitored conditions.

According to yet another aspect of the present invention, a method of controlling an AGV includes the steps of providing a controller on-board the AGV, monitoring an operating condition of the AGV by the controller, and monitoring a state of charge of a rechargeable AGV power source by the controller. The method further includes the steps of determining, by the controller, to recharge the AGV power source based upon the monitored operating condition and the monitored state of charge, and controlling a recharging process, by the controller, when the AGV power source is recharged.

These and other aspects, objects, and features of the present invention will be understood and appreciated by those skilled in the art upon studying the following specification, claims, and appended drawings.

BRIEF DESCRIPTION OF DRAWINGS

The present invention will now be described, by way of example, with reference to the accompanying drawings, in which:

FIG. 1 is a block diagram of an automatic guided vehicle system, in accordance with one embodiment of the present invention;

FIG. 2 is a flow chart illustrating a method of determining if an automatic guided vehicle power source should be recharged, in accordance with one embodiment of the present invention; and FIG. 3 is a flow chart illustrating a method of recharging a rechargeable power source of an automatic guided vehicle, in accordance with one embodiment of the present invention.

DETAILED DESCRIPTION OF PREFERRED EMBODIMENTS

For purposes of description herein, the terms "upper", "lower", "right", "left", "rear", "front", "vertical", "horizontal" and derivatives thereof shall relate to the invention as oriented during normal operation. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In regards to FIG. 1, an automatic guided vehicle (AGV) system is generally shown at reference identifier 100, wherein the AGV system 100 is typically used for automatically transporting loads along a predetermined path. The AGV system 100 includes a stationary master controller 102, at least one stationary system power source 104, and a plurality of self-propelled AGVs generally indicated at 106. Exemplary AGVs that can be utilized in the AGV system 100 are disclosed in U.S. patent application Ser. No. 12/080,725, entitled "AUTOMATED AGV TRAILER LOADER/UNLOADER AND METHOD," the entire disclosure being hereby incorporated herein by reference.

At least one of the plurality of AGVs 106 can include a drive assembly 108, a rechargeable power source 110, and an on-board controller 112. Typically, the controller 112 is on-board the AGV 106, such that the on-board controller 112 is integrated with hardware circuitry of the AGV 106, according to one embodiment. The rechargeable power source 110 is releasably mounted, on-board the AGV 106, and is configured to supply power to the drive assembly 108 for powering and moving the AGV 106 along the predetermined path. Thus, rechargeable power source 110 can be on-board the AGV 106, such that the rechargeable power source 110 moves with the AGV when the AGV is transporting loads along predetermined paths, but can be removed from the AGV 106.

The rechargeable power source 110 is adapted to be selectively electrically connected to the system power source 104, which supplies an electrical power to recharge the rechargeable power source 110. The on-board controller 112 is mounted in the AGV 106, and configured to substantially continuously monitor at least two conditions including an operating condition of the AGV 106, and a state of charge of the rechargeable power source 110, whereby when the rechargeable power source 110 is electrically connected to the system power source 104, the on-board controller 112 determines when the rechargeable power source 110 of the AGV 106 is to be recharged, controls a recharging process of the rechargeable power source 110, and communicates at least one of the monitored conditions to the master controller 102. Thus, the on-board controller 112 of the AGV 106 determines when the rechargeable power source 110 of the AGV 106 needs to be recharged, and controls the recharging process of the rechargeable power source 110, as described in greater detail herein According to one embodiment, the on-board controller 112 of the AGV 106 controls the recharging of the rechargeable power source 110 independent of receiving information from the master controller 102. Thus, the AGV 106 receives operating commands to transport loads along the predetermined path from the master controller 102, while the on-board controller 112 of the AGV 106 monitors the operating conditions of the AGV 106 and determines when the rechargeable power source 110 is to be recharged, and controls the recharging of the rechargeable power source 110 without receiving information as to recharging the rechargeable power source 110 from the master controller 102. When the on-board controller 112 determines that the rechargeable power source 110 is to be recharged, the AGV 106 is positioned and electronically connected to the system power source 104, as represented by the dashed lines between the system power source 104 and the rechargeable power source 110 illustrated in FIG. 1.

Typically, the AGV 106 includes a memory 114 in communication with the on-board controller 112, wherein the memory 114 includes at least one executable software routine 116, such that the on-board controller 112 executes the executable software routine 116 to monitor the operating conditions of the AGV 106, determine when to recharge the rechargeable power source 110, and control the recharging process of the rechargeable power source 110. Additionally or alternatively, the AGV 106 wirelessly communicates with the master controller 102, according to one embodiment, as represented by the dashed lines between the master controller 102 and the on-board controller 112 illustrated in FIG. 1. For purposes of explanation and not limitation, the wireless communication is a radio frequency (RF) signal, an infrared (IR) signal, the like, or a combination thereof. However, it should be appreciated by those skilled in the art that other suitable forms of wireless or non-wireless communication can be utilized.

By having the communication (e.g., wireless communication) between the master controller 102 and the on-board controller 112, the master controller 102 can assist the on-board controller 112 (e.g., communicate a commanded task) in making decisions, while including much of the intelligence in the on-board controller 112 rather than the master controller 102. Further the on-board controller 112 can communicate information or data to the master controller 102 regarding the recharging processes performed and/or other desirable information, wherein the master controller 102 can receive the information and generate a report that includes information received from a plurality of the AGVs 106 in the system 100.

Based upon the electrochemical composition of the rechargeable power source 110, the rechargeable power source 110 may be equalized, recharged to a state of charge below a threshold value that is lower than a one hundred percent (100%) state of charge, or a combination thereof. The on-board controller 112 determines when the rechargeable power source 110 of the AGV 106 is to be recharged, determines when the rechargeable power source 110 is to be equalized, determines when the rechargeable power source 110 is to be recharged to a state of charge above a threshold value, or a combination thereof.

According to one embodiment, the on-board controller 112 controls the recharging process, and therefore the electrical current supplied to the rechargeable power source 110, as if the on-board controller 112 were an on/off switch. Thus, the on-board controller 112 determines if the rechargeable power source 110 is to be connected to the system power source 104 to be recharged, and if the rechargeable power source 110 is to be disconnected from the system power source 104 to end the recharging. In such an embodiment, the system power source 104 controls the electrical current supplied to the rechargeable power source 110, as described in greater detail herein According to an alternate embodiment, the on-board controller 112 controls the recharging process by controlling electrical current supplied from the system power source 104 to the rechargeable power source 110, such that the on-board controller 112 can decrease an electrical current supplied to the rechargeable power source 110 when the electrical current supplied to the rechargeable power source is to recharge the rechargeable power source 110 to a state of charge above the threshold value. In such an embodiment, the electrical current supplied to the rechargeable power source 110 is supplied at a substantially constant voltage potential.

By way of explanation and not limitation, the threshold value is eighty percent (80%) state of charge of the rechargeable power source 110. Generally, rechargeable batteries (e.g., the rechargeable power source 110) having an electrochemical composition, such as, but not limited to, lithium or lithium ion, have characteristics that result in an increase in emitted thermal radiation (i.e., heat) when being recharged above a certain state of charge (e.g., eighty percent (80%)). Thus, it is desirable to recharge the rechargeable power source 110 above the threshold value at times when the battery can be allowed to cool in temperature for a period of time after charging. It can be desirable for the on-board controller 112 to decide to electrically connect to the rechargeable power source 110 to the recharger (e.g., the system power source 104) for a period of time that the battery can be fully recharged rather than charged to a state of charge above the threshold value but below being fully charged, according to one embodiment. When such a rechargeable battery is utilized on the AGV 106, the on-board controller 112 can determine if the rechargeable power source 110 should be recharged above the threshold value, and if the AGV 106 as the rechargeable power source 110, based upon operating conditions and transporting commands, has a sufficient time period to remain electrically connected to the system power source 104.

The system power source 104 can always attempt to recharge the rechargeable power source 110 above the threshold value and equalize the rechargeable power source 110 without receiving a command from the master controller 102, according to one embodiment. The on-board controller 112 then makes the determination to electrically disconnect from the system power source 104 prior to recharging the rechargeable power source 110 above the threshold value, equalize the rechargeable power source 110, or a combination thereof.

According to one embodiment the AGV system 100 can include a system power source 104' which always attempts to recharge the rechargeable power source 110 above the threshold value, but never attempts to equalize the rechargeable power source 110. In such an embodiment, the on-board controller 112 can determine that the rechargeable power source 110 is to be recharged above the threshold value, but not equalized, the on-board controller 112 can command the AGV to proceed to and electrically connect to the system power source 104' that is configured to only recharge the rechargeable power source 110 above the threshold value and not also equalize the rechargeable power source 110 (i.e., the system power source 104).

A sensor 118 can be in communication with the rechargeable power source 110 and the on-board controller 112, wherein the sensor 118 can determine an electrical current supplied to the rechargeable power source 110, a voltage potential of the electrical current supplied to the rechargeable power source 110, or a combination thereof, according to one embodiment. The monitored data (e.g., the electrical current and/or the voltage potential) can be communicated to and utilized by the on-board controller 112 to control the recharging process of the rechargeable power source 110. The sensor 118 can further measure a voltage potential of the rechargeable power source 110. By monitoring the voltage potential of the rechargeable power source 110 utilizing the sensor 118, the on-board controller 112 can determine if the rechargeable power source 110 is to be recharged, if the rechargeable power source 110 should continue to be recharged, or a combination thereof. According to one embodiment, such a determination can be made by comparing a voltage potential monitored by the sensor 118 to a threshold value, which can be performed by the on-board controller 112. Thus, the on-board controller 112 determines when to connect and disconnect the rechargeable power source 110 based upon monitored operating conditions, comparing a monitored operating condition to a threshold value, or a combination thereof. Typically, such a determination is made without input from the master controller 102.

For purposes of explanation and not limitation, the at least one monitored conditions can include of a state of charge of the rechargeable power source 110, a non-charging command (e.g., a command independent of recharging the rechargeable power source 110) received by the on-board controller 112 from the stationary master controller 102, an equalization schedule of the rechargeable power source 110, a commanded task received by the AGV 106 from the master controller 102, the AGV 106 location along a path in the system 100, environmental conditions, a comparison of two or more monitored conditions, or a combination thereof. It should be appreciated that other monitored operating conditions of the AGV 106 can be utilized to determine when the rechargeable power source 110 of the AGV 106 is to be recharged, and how the recharging process of the rechargeable power source 110 should be controlled. Thus, the on-board controller 112 can determine if the rechargeable power source 110 is to be recharged, recharged above the threshold value, equalized, or a combination thereof based upon at least one of the state of charge of the rechargeable power source 110, command received from the stationary master controller 102 independent of recharging information with respect to the rechargeable power source 110, or an equalization schedule.

By way of explanation and not limitation, in operation, the AGV 106 can receive a command from the master controller 102 to perform a task. The on-board controller 112 can then determine, based upon the received command and the currently monitored state of charge of the on-board rechargeable power source 110, whether the AGV 106 can perform the commanded task. The on-board controller 112 can determine if the on-board rechargeable power source 110 does not have an adequate state of charge to perform the commanded task. If the on-board controller 112 determines that the on-board rechargeable power source 110 does not have an adequate state of charge to perform the task, the on-board controller 112 can over-ride the received command from the master controller 102, and control the AGV 106 to electrically connect the on-board rechargeable power source 110 and the system power source, 104,104'. The on-board controller 112 can also communicate with the master controller 102 that the AGV 106 is not performing the commanded task, and instead is proceeding to a charging station (e.g., a location wherein the on-board rechargeable power source can electrically connect to the stationary system power source 104,104') within the system 100. Further, the on-board controller 112 can receive the command from the mater controller 102, determine the state of charge of the rechargeable power source 110, and monitor or determine an ambient temperature (e.g., an outdoor temperature) of a location along the predetermined path, such that the on-board controller 112 determines that the AGV 106 cannot perform the commanded task due to the rechargeable power source 110 not having an adequate state of charge, the cold ambient temperature, the distance along the predetermined path to be traveled, or a combination thereof, and instead, that the AGV 106 is proceeding to a charging station within the system 100.

Additionally or alternatively, the on-board controller 112 can determine when the on-board rechargeable power source 110 is to be replaced. According to one embodiment, the on-board controller 112 can determine that the on-board rechargeable power source 110 is not adequately maintaining its' state of charge, such that the on-board rechargeable power source 110 requires recharging at shorter intervals (e.g., less operating time between charges). In such an embodiment, the on-board controller 112 can communicate to the master controller 102 that the AGV 106 is proceeding to a location within the system 100, wherein the on-board rechargeable power source 110 can be replaced.

With respect to FIGS. 1 and 2, a method of determining if the rechargeable power source 110 of the AGV 106 is to be charged is generally shown in FIG. 2 at reference identifier 200. The method 200 starts at step 202, and proceeds to step 204, wherein the on-board controller 112 monitors an operating condition of the AGV 106. At step 206, the on-board controller 112 monitors a state of charge of a rechargeable power source 110. At decision step 208, it is dynamically determined if the rechargeable power source 110 is to be recharged by the on-board controller 112 based upon the monitored AGV 106 operating conditions and the state of charge of the rechargeable power source 110. If it is dynamically determined at decision step 208 that the rechargeable power source 110 is not to be recharged, then the method 200 returns to step 204. However, if it is dynamically determined at decision step 208 that the rechargeable power source 110 is to be recharged, the method 200 proceeds to step 210. At step 210, the rechargeable power source 110 is recharged, and the method 200 then ends at step 212. It should be appreciated by those skilled in the art that the method 200 is continuously performed while the AGV 106 is in an operational state (e.g., the AGV 106 is on).

By including the on-board controller 112, which dynamically determines to recharge the rechargeable power source 110, which differs from merely determining if the rechargeable power source 110 is to be recharged, fully charged, or equalized based upon a non-intelligent scheduling to perform the functions (i.e., full recharge once a week, and equalize every other week). Instead, the on-board controller 112, having access to the AGV 106 operating conditions, can dynamically determine when to perform these functions on the rechargeable power source 110 to maximize the life and performance of the rechargeable power source 110, according to one embodiment.

In regards to FIGS. 1 and 3, a method of charging the rechargeable power source 110 is generally shown in FIG. 3 at reference identifier 210. The method 210 starts at step 320, and proceeds to decision step 321, wherein it is determined if a state of charge of the rechargeable power source 112 is below a threshold value (e.g., a value wherein it is desirable to recharge the rechargeable power source 112). If it is determined at decision step 321 that the state of charge of the rechargeable power source is below a threshold value, then the method 210 proceeds to step 322, wherein the AGV 106 is electrically connected to the system power source 104. At step 324, the electrical current supplied to the rechargeable power source 110 is monitored and controlled. At decision step 326, it is determined if the rechargeable power source 110 has state of charge above a threshold value. If it is determined at decision step 326 that the rechargeable power source 110 has a state of charge below a threshold value, the method 210 returns to step 324, wherein the electrical current is continued to be supplied and monitored to the rechargeable power source 110. However, if it is determined at decision step 326 that the rechargeable power source 110 has a state of charge above a threshold value, then the method 210 proceeds to decision step 328.

At decision step 328 it is determined if the rechargeable power source 110 is to be equalized. If it is determined at decision step 328 that the rechargeable power source 110 is to be equalized, then the method 210 proceeds to step 330, wherein the equalization of the rechargeable power source 110 is monitored and controlled by the on-board controller 112. The method 210 then proceeds to step 332, wherein the AGV 106 is disconnected from the system power source 104, and the method 210 then ends at step 334. However, if it is determined at decision step 328 that the rechargeable power source 110 is not to be equalized, then the method 210 proceeds to step 332. At step 332, the AGV 106 is disconnected from the system power source 104, and the method 210 then ends at step 334. Further, if it is determined at decision step 321 that the state of charge of the rechargeable power source 112 is not below a threshold value, then the method 210 then ends at step 334. It should be appreciated by those skilled in the art that the method 210 is continuously performed when the AGV 106 is in an operational state (e.g., the AGV 106 is on).

Advantageously, the on-board controller 112 of the AGV 106 monitors the operating conditions of the AGV 106, determines when the rechargeable power source 110 is to be recharged, when the rechargeable power source 110 is to be recharged above a threshold value, and when the rechargeable power source 110 is to be equalized, controls such a recharging process, independent of receiving recharging information from the master controller 102. Thus, each AGV 106 of the AGV system 100 can accurately monitor the operating conditions of the AGV 106 and control the recharging of the rechargeable power source 110. It should be appreciated that additional or alternative advantages may result from the system 100 and methods 200 and 210. It should further be appreciated that alternative combinations of the above elements may be utilized, which may not have been explicitly described herein.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is as follows:

1. In an automatic guided vehicle (AGV) system for automatically transporting loads along a predetermined path, the improvement comprising:
   a stationary master controller;
   at least one stationary system power source; and
   a plurality of self-propelled AGVs, wherein at least one of said AGVs comprises:
      a drive assembly;
      a rechargeable power source on-board said AGV, and
         configured to supply power to said drive assembly for moving said AGV along the predetermined path, wherein said rechargeable power source is adapted to be selectively electrically connected to said system power source, which supplies an electrical power to recharge said rechargeable power source; and a controller on-board said AGV, and configured to determine when said rechargeable power source of said AGV is to be recharged, control a recharging process of said rechargeable power source independent of receiving information from said master controller, communicate with said master controller, and substantially continuously monitor at least two conditions comprising:

an operating condition of said AGV; and a state of charge of said rechargeable power source;

whereby when said rechargeable power source is electrically connected to said system power source, said controller dynamically determines when said rechargeable power source of said AGV is to be recharged, controls a recharging process of said rechargeable power source independent of receiving information from said master controller, and communicates at least one of said monitored conditions to said master controller.

2. The AGV system of claim 1, wherein said controller determines when said rechargeable power source of said AGV is to be equalized.

3. The AGV system of claim 1, wherein said controller determines when said rechargeable power source is to be recharged to a state of charge above a threshold value.

4. The AGV system of claim 3, wherein said controller decreases an electrical current supplied to said rechargeable power source when said electrical current supplied to said rechargeable power source to recharge said rechargeable power source to a state of charge above said threshold value.

5. The AGV system of claim 1, wherein said master controller controls said stationary system power source to recharge said rechargeable power source above a threshold value, and equalize said rechargeable power source.

6. The AGV system of claim 1, wherein said operating condition of said AGV comprises at least one of:

a non-charging command received by said controller on-board said AGV from said stationary master controller; and an equalization schedule of said rechargeable power source.

7. The AGV system of claim 1, wherein said controller is configured to over-ride a command received from said master controller independent of receiving information from said master controller other than said command when said controller determines said rechargeable power source has an inadequate state of charge to perform said command received from said master controller.

8. An automatic guided vehicle (AGV) comprising:
a drive assembly;
a rechargeable power source on-board the AGV, and configured to supply power to said drive assembly; and
a controller on-board the AGV, and configured to substantially continuously monitor at least two conditions comprising of:
an operating condition of the AGV;
a state of charge of said power source; and
an electrical power supplied for recharging said rechargeable power source, wherein said controller dynamically determines when said rechargeable power source of the AGV is to be recharged independent of receiving information from a stationary master controller of an AGV system that comprises the AGV, and controls a recharging process of said power source based upon at least one of said monitored conditions.

9. The AGV of claim 8, wherein said controller determines when said rechargeable power source of said AGV is to be equalized.

10. The AGV of claim 8, wherein said controller determines when said rechargeable power source is to be recharged to a state of charge above a threshold value.

11. The AGV of claim 10, wherein said controller decreases an electrical current supplied to said rechargeable power source when said electrical current supplied to said rechargeable power source to recharge said rechargeable power source to a state of charge above said threshold value.

12. The AGV of claim 8, wherein said operating condition comprises at least one of:

a non-charging command received by said controller from a stationary master controller of an AGV system that comprises the AGV; and an equalization schedule of said rechargeable power source.

13. The AGV of claim 8, wherein the AGV is included in said AGV system that further comprises a stationary master controller and at least one stationary system power source, wherein said master controller controls said stationary system power source to recharge said rechargeable power source above a threshold value, and equalize said rechargeable power source.

14. The AGV of claim 8, wherein said controller is configured to over-ride a command received from a master controller of said AGV system independent of receiving information from said master controller other than said command when said controller determines said rechargeable power source has an inadequate state of charge to perform said command received from said master controller.

15. A method of controlling an automatic guided vehicle (AGV), said method comprising the steps of:
providing a controller on-board the AGV;
monitoring an operating condition of the AGV by said controller;
monitoring a state of charge of a rechargeable AGV power source by said controller;
dynamically determining, by said controller, to recharge said AGV power source based upon said monitored operating condition and said monitored state of charge, wherein said dynamic determination is made independent of receiving information from a master controller of an AGV system that includes the AGV; and
controlling a recharging process by said controller when said AGV power source is recharged, wherein said controlling of said recharging process is independent of receiving information from a master controller of said AGV system that includes the AGV.

16. The method of claim 15 further comprising the step of determining, by said controller, when said rechargeable power source is to be equalized.

17. The method of claim 15 further comprising the step of determining, by said controller, when said rechargeable power source is to be recharged to a state of charge above a threshold value.

18. The method of claim 15, wherein said at least one monitored condition comprises at least one of:

a command received by said controller from a stationary master controller of said AGV system that includes the AGV; and an equalization schedule of said rechargeable power source.

19. The method of claim 15 further comprising the steps of:
providing an AGV system comprising a master controller and a stationary power source; and
controlling said stationary power source, by said master controller, to recharge said rechargeable power source above a threshold value, and equalize said rechargeable power source.

20. The method of claim 15 further comprising the step of over-riding, by said controller, a command received from a master controller of said AGV system independent of receiving information from said master controller other than said command when said controller determines said rechargeable power source has an inadequate state of charge to perform said command received from said master controller.

21. A method of controlling an automatic guided vehicle (AGV) for automatically transporting loads along a predetermined path in at least one of a warehouse, a factory, and a shipyard, said method comprising:
providing a controller on-board the AGV;
providing an AGV system comprising the AGV, a master controller, and a stationary power source;
monitoring an operating condition of the AGV by said controller;
monitoring a state of charge of a rechargeable AGV power source by said controller;
dynamically determining, by said controller, to recharge said AGV power source based upon said monitored operating condition and said monitored state of charge, wherein said dynamic determination is made independent of receiving information from said master controller;
controlling a recharging process by said controller when said AGV power source is recharged, wherein said controlling of said recharging process is independent of receiving information from said master controller;
determining, by said controller, when said rechargeable power source is to be equalized;
determining, by said controller, when said rechargeable power source is to be recharged to a state of charge above a threshold value;
controlling said stationary power source, by said master controller, to recharge said rechargeable power source above a threshold value, and equalize said rechargeable power source; and
over-riding, by said controller, a command received from said master controller independent of receiving information from said master controller other than said command when said controller determines said rechargeable power source has an inadequate state of charge to perform said command received from said master controller.

* * * * *